March 19, 1929.   E. F. W. ALEXANDERSON   1,706,094
POWER AMPLIFYING MEANS
Filed Oct. 1, 1925

Inventor:
Ernst F. W. Alexanderson;
by
His Attorney.

Patented Mar. 19, 1929.

1,706,094

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

POWER-AMPLIFYING MEANS.

Application filed October 1, 1925. Serial No. 59,899.

My invention relates to power amplifying means, and has for its object the provision of means for amplifying the power of an electric circuit in such manner that predetermined voltage relations may be maintained.

In one of its aspects my invention relates to a precision amplifier whereby the power of an electric circuit may be amplified with a predetermined voltage ratio. My invention has general application for purposes wherein it is desired to amplify electrical power while maintaining a strict proportionality between the voltage of an output circuit and the voltage of the supply source. By a strict proportionality I mean a higher degree of proportionality than can be determined by the characteristics of the tubes and circuits of a simple amplifier. It has application, for example, in the amplification of the output of various instruments for transmitting angular motion whereby the instruments may be relieved of a large portion of their load, and as a result be reduced in size and made easier to operate. It may also be used for amplifying signals, for example, in the transmission and reception of messages by radio, as well as for various other purposes.

In carrying out my invention in one form I utilize electron discharge amplifying devices and control these devices in accordance with the voltages of the circuit to be amplified and the output circuit of the amplifying devices so as to regulate the voltage of the output circuit. This feature of regulation of the output voltage distinguishes my invention from the well known feed-back arrangements of radio circuits in which no voltage regulation takes place.

Figure 1:
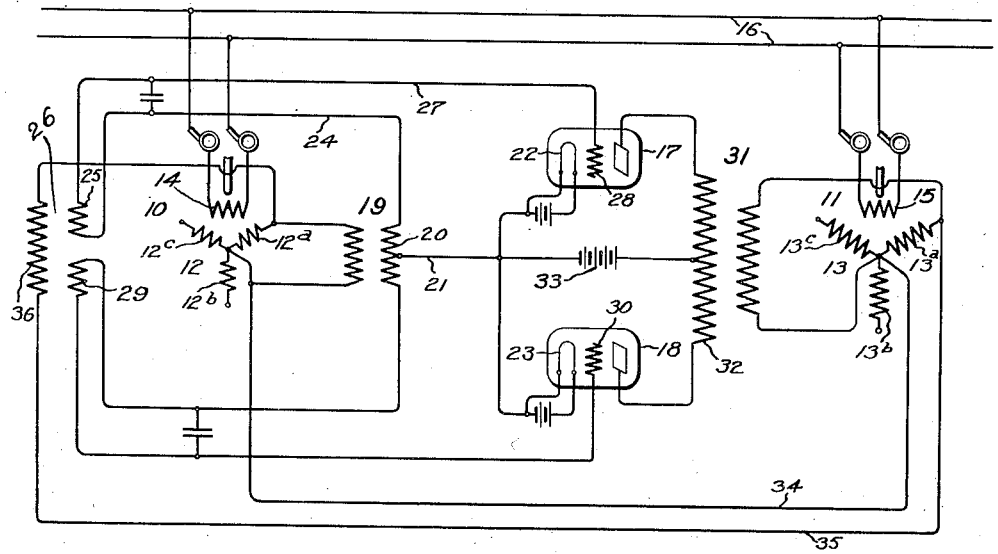
Figure 2:
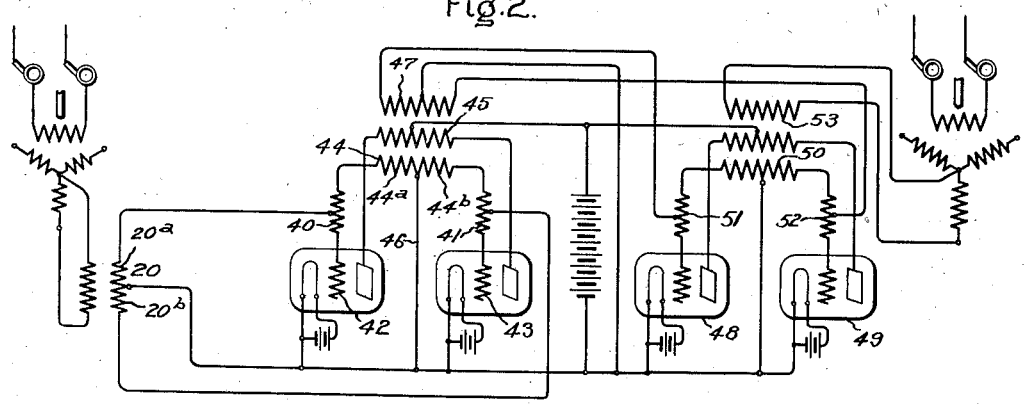
Figure 3:
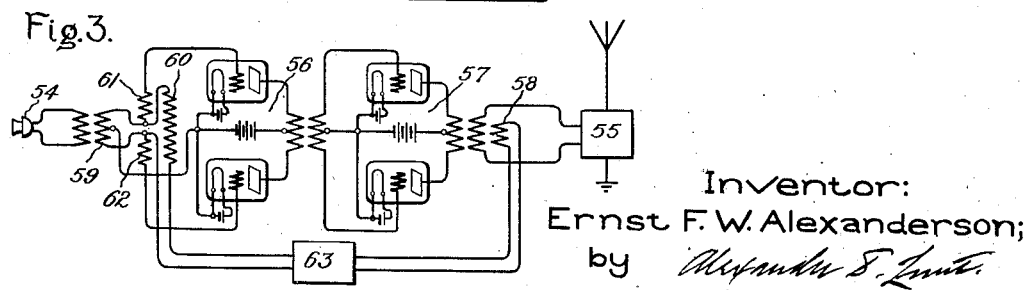

For a more complete understanding of my invention reference should be had to the accompanying drawing in which Fig. 1 is a diagrammatic view showing power amplifying means embodying my invention, while Figs. 2 and 3 are diagrammatic views showing modified forms of my invention.

Referring to Fig. 1 of the drawing, I have shown my invention in one form as applied to the amplification of the output of an instrument for transmitting angular motion, the amplified output being used to operate one or more receiving devices in synchronism with the transmitting device. In the form shown, the transmitting device 10 and the receiving device 11 are of an alternating current type and are similar in construction, they being provided respectively with poly-circuit armature windings 12 and 13 and with field windings 14 and 15, the field windings being rotatably mounted. The armature windings may be, and preferably are, physically similar to 3-phase distributed armature windings. The field windings 14 and 15 are connected to a suitable source of alternating current supply 16 and induces alternating electromotive forces in the various circuits of their respective armature windings. It will be observed that the electromotive forces induced in the circuits of the armature windings will vary relatively in value and direction in accordance with the angular position of the field winding. In the operation of these instruments, similar points of the two armature windings are connected together and when the rotor of the receiving device is in correspondence with the rotor of the transmitting device, the electromotive forces in the two armature windings are substantially equal and opposite to each other so that no current is set up. Upon movement of the transmitting device the electromotive forces induced in the circuits of its armature windings are changed whereby an unbalanced voltage condition is produced, with resulting flow of current, and the receiving device thereby caused to move to a position of angular agreement.

In accordance with my invention I provide means for amplifying the output of the transmitting device so that the transmitting device supplies only a relatively small part of the energy required to operate the one or more receiving devices responsive to it. As shown in Fig. 1 I have provided two electron discharge amplifying devices or tubes 17 and 18 which are connected in a push-and-pull circuit to amplify the output of one circuit or coil 12ª of the armature 12, the three coils 12ª, 12ᵇ and 12ᶜ being connected in Y. The coil 12ª is connected to the input circuits of the tubes through a transformer 19, the secondary 20 of which has a central tap 21 leading to the filaments 22 and 23 of the tubes. One terminal of the secondary 20 is connected by way of a conductor 24 through the secondary coil 25 of a transformer 26 and thence through a conductor 27 to the grid 28 of the tube 17. The remaining or lower terminal of the winding 20 is connected in a similar manner through a second secondary 29 of the transformer 26 to the grid 30 of the tube 18. The output circuits of the two tubes are connected through a transformer 31 to the coil 13$^a$ of the armature winding 13 in a well known manner. The primary winding 32 of the transformer 31 is provided with a central tap, as shown, between which point and the filaments a B battery 33 is connected. By means of two conductors 34 and 35 similar terminals of the coils 12$^a$ and 13$^a$ are connected together, the primary winding 36 of the transformer 26 being included in the circuit of one of the conductors 35. It will be understood that similar amplifying arrangements will be used for the coils 12$^b$ and 12$^c$, although for the sake of simplicity the amplifying means for these coils has not been shown in the drawing, the amplified outputs of the coils 12$^b$ and 12$^c$ being supplied to the coils 13$^b$ and 13$^c$ of the receiver.

As thus arranged the operation of my invention is as follows: Both halves of the electromotive force induced in the coil 12$^a$ is amplified by the two tubes 17 and 18, the tubes operating alternately since their grids are alternately positive and negative. The amplified output of the tubes may have the same voltage that is applied to their input circuits by the coil 12$^a$, or the voltage of the amplified output may have any predetermined relation therewith depending upon the characteristics of the receiving device 11. It is contemplated, however, that in this particular application the receiving device will have the same voltage characteristics as the transmitting device so that the amplified output will have the same voltage as the coil 12$^a$.

Due to differences in the characteristics of the tubes the amplified output will ordinarily not be equal to the input voltage. It is very important in a system of this character that the electromotive forces induced in the winding 12 be impressed on the winding 13 without change in value or phase, otherwise the receiver will not follow accurately. It is to regulate the value and phase of the output voltage with great precision that the transformer 26 is provided. When the output voltage is equal to the voltage of the coil 12$^a$ no voltage is impressed on the primary 36 of the transformer 26 and the transformer therefore has no effect on the operation of the tubes, but any difference in these voltages is impressed on the winding 36 and is in turn applied by the secondaries 25 and 29 to the input circuits of the tubes whereby the tubes are caused to equalize the voltages. For example, if the output voltage is less than that of the winding 12$^a$ the secondaries 25 and 29 will be excited in the same direction as the halves of the secondary 20 included respectively in circuit with them whereby the voltages applied to the input circuits of the tubes will be increased. In case the output voltage is too high the secondaries 25 and 29 will be excited in the opposite direction so that lower voltages will be applied to the input circuits of the tubes. It will thus be observed that the tubes are automatically regulated to maintain the output voltage equal to the voltage of the winding 12$^a$. Obviously, however, any suitable voltage ratio could be maintained. This action also maintains the output voltage in phase with that of the winding 12$^a$. It will be understood, of course, that the electromotive forces of the windings 12$^b$ and 12$^c$ will be amplified with precision in a similar manner and applied to the corresponding windings 13$^b$ and 13$^c$ of the receiving device.

In the modified form of my invention shown in Fig. 2 two stages of push-and-pull amplification are provided, means also being provided for regulating the output voltage of each stage. In this form of my invention, the terminals of the secondary winding 20 are connected through the lower portions of autotransformers 40 and 41 to the grids 42 and 43 of the tubes of the first stage. The upper terminals of the autotransformers are connected to the terminals of an auxiliary winding 44 which forms a secondary of the output transformer 45. The middle point of this winding 44 is connected by means of a conductor 46 to the middle point of the winding 20. It will be observed that the left-hand half 44$^a$ of the winding 44 is connected across the upper half 20$^a$ of the winding 20, the upper portion of the autotransformer 40 being connected in series with the two. In a similar manner the remaining half 44$^b$ of the winding 44 is connected across the remaining half 20$^b$ of the winding 20 in series with the upper portion of the autotransformer 41.

With this arrangement any difference between the voltages of the winding sections 44$^a$ and 20$^a$ is applied to the upper portion of the autotransformer 40 whereby its lower portion is excited so as to regulate the tube 42. For example, if the voltage of section 44$^a$ is higher than the voltage of section 20$^a$, the lower portion of the autotransformer 40 will be excited in opposition to the section 20$^a$ and the output voltage of the tube thereby reduced. The reverse action obviously takes place when the voltage of section 44$^a$ is lower than that of section 20$^a$. The section 44$^b$ regulates the output of the tube 43 in a similar manner. The voltage of the output transformer 45 is thus regulated to be equal or to have a desired predetermined relation with the voltage of the transmitting device.

The secondary winding 47 of the output transformer 45 is provided with a central tap and is connected to the two tubes 48 and 49, forming the next push-and-pull stage of amplification, in the same manner as the secondary 20, an auxiliary coil 50 and autotransformers 51 and 52 being likewise provided to regulate the voltage of this stage in the manner previously described in connection with the tubes 42 and 43. Any desired number of stages of amplification can obviously be used although only two stages are shown, the secondary winding 53 of the output transformer of the last stage being connected to the receiving device.

In Fig. 3 I have shown an application of my invention to the transmission of messages by radio, amplifying means substantially the same as that shown in Fig. 1 being provided to amplify the output of a microphone 54 for the control of radio transmitting means 55 of any suitable form. Two stages 56 and 57 of push-and-pull amplification by means of electron discharge devices or tubes are shown. The output voltage is regulated by means of an auxiliary secondary winding 58 on the output transformer of the last stage, which winding is connected across the terminals of the secondary winding 59 of the input transformer, a primary winding 60 being included in the connections. This primary winding 60 is associated with two secondary windings 61 and 62, in the grid circuits of the tubes of the first stage respectively. The voltage of the winding 58 is thus maintained equal to the voltage of the secondary winding 59, as will be understood with reference to the description of Fig. 1. Any desired voltage ratio may be provided between the output voltage and the voltage of the secondary winding 58, this ratio being the amplification ratio. A suitable phase shifter 63 is provided in the connections between the secondary windings 58 and 59 whereby any desired displacement or adjustment in phase of the voltage of the winding 58 can be made before comparing it with the voltage of the winding 59.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An electric power amplifier comprising power amplifying means provided with input and output circuits, electrical connections between said input circuit and the electrical supply source to be amplified, and means for comparing said supply source and said output circuit and for affecting said input circuit with the difference in certain conditions of said supply source and said output circuit, whereby a predetermined relation is maintained between said output circuit and said supply source.

2. An electric power amplifier comprising power amplifying means provided with input and output circuits, electrical connections between said input circuit and the electrical supply source to be amplified, and means responsive to the voltages of said supply source and said output circuit for regulating the voltage so as to obtain a strict proportionality between the input and the output circuits.

3. An electric power amplifier comprising power amplifying means provided with input and output circuits, electrical connections between said input circuit and the electrical supply source to be amplified, and means responsive to the difference between the voltages of said supply source and said output circuit for maintaining a predetermined relation between said voltages.

4. An electric power amplifier comprising an electron discharge device provided with input and output circuits, electrical connections between said input circuit and the electrical supply source to be amplified, and means for affecting said input circuit with the voltage of said output circuit so as to regulate said output voltage, and thereby maintain a strict proportionality between the voltage of said output circuit and the voltage of said supply source.

5. An electric power amplifier comprising an electron discharge device provided with input and output circuits, electrical connections between said input circuit and the electrical supply source to be amplified, and means responsive to the voltages of said supply source and said output circuit for controlling said discharge device so as to maintain a strict proportionality between the voltage of said output circuit and the voltage of said supply source.

6. An electric power amplifier comprising an electron discharge device provided with input and output circuits, electrical connections between said input circuit and the electrical supply source to be amplified, and electrical connections between said supply source and said output circuit including means for controlling said input circuit to maintain a predetermined relation between the voltage of said output circuit and the voltage of said supply source.

7. An electric power amplifier comprising an electron discharge device provided with input and output circuits, electrical connections between said input circuit and the electrical supply source to be amplified, and means responsive to the difference between the voltages of said supply source and said output circuit for maintaining a predetermined relation between said voltages.

8. An electric power amplifier comprising an electron discharge device provided with input and output circuits, electrical connection between said input circuit and the electrical supply source to be amplified, and electrical connection between said supply source and said output circuit including means for energizing said input circuit in accordance with the difference between the voltages of said supply source and said output circuit so as to maintain a predetermined relation between said voltages.

9. An electric power amplifier comprising an electron discharge device provided with input and output circuits, electrical connections between said input circuit and the electrical supply source to be amplified, a coil in the input circuit of said discharge device, and means for energizing said coil in accordance with the difference between the voltages of said supply source and said output circuit whereby a predetermined relation is maintained between the voltage of said output circuit and the voltage of said supply source.

10. The combination with a motion transmitting device provided with a polycircuit armature winding having alternating electromotive forces induced in its circuits, of means for amplifying the power output of said armature winding comprising a plurality of electron discharge devices provided with input and output circuits, electrical connections between the input circuits of said tubes and the circuits of said armature winding respectively, and means for controlling said input circuit in accordance with the voltage of said output circuit so as to maintain a predetermined relation between the voltages of said armature circuits and said output circuits.

11. The combination with a motion transmitting device provided with a polycircuit armature winding and a single circuit field winding supplied with alternating current of amplifying means cooperating with said armature winding comprising electron discharge devices provided with input and output circuits, electrical connections between said armature winding and the input circuits of said discharge devices, and means for controlling said electron discharge devices in accordance with the differences between the voltages of the circuits of said armature winding and said output voltages so as to maintain a predetermined relation between said voltages.

12. A system for the transmission of angular motion comprising electrical transmitting and receiving devices provided with moving elements, said devices having electromotive forces varying in accordance with the angular positions of their moving elements, power amplifying means having its input circuit connected to said transmitting device and its output circuit connected to said receiving device, and means for varying the energization of said input circuit in accordance with the difference between the voltages of said transmitting device and said output circuits so as to maintain a predetermined relation between said voltages whereby said receiving device is caused to repeat the movements of said transmitting device.

13. A system for the transmission of angular motion comprising a transmitter provided with a polycircuit armature winding and a single circuit field winding, a receiver having similar windings, a source of alternating current supply connected to said field winding, electron discharge amplifying devices provided with input and output circuits having their input circuits connected to the circuits of the armature windings of said transmitter and receiver respectively, and auxiliary means responsive to the difference between the voltages of said armature winding and said output circuits for controlling said input circuits so as to maintain a predetermined relation between said voltages, whereby said receiving device is caused to repeat the movement of said transmitting device.

14. The combination with an electrical power amplifying device provided with input and output circuits, of an electrical power source to be amplified, electrical connections between said source and said input circuit, a transformer provided with input and output circuits, electrical connections between the output circuit of said amplifying device and the input circuit of said transformer, and electrical connections between the output circuit of said transformer and said supply source including means for affecting the input circuit of said amplifying device with the difference in the voltages of said supply source and the output circuit of said transformer.

15. The combination with an amplifying device provided with input and output circuits, a source of electrical supply, electrical connections between said source and said input circuit, a transformer having input and output circuits, connections between the input circuit of said transformer and the output circuit of said amplifying device, and electrical connections between the output circuit of said transformer and said supply source including means for impressing the difference between said supply source and said transformer output voltages upon the input circuit of said amplifying device so as to maintain a predetermined relation between said voltages.

16. Power amplifying device provided with input and output circuits, a source of electrical supply, a transformer provided with input and output circuits, electrical connections between said source and the input circuit of said power amplifying device including the output circuit of said transformer, and connections between said supply source and the output circuit of said amplifying means whereby the voltages thereof are in opposition including the input circuit of said transformer whereby a predetermined relation is maintained between the output circuit of said amplifying means and said supply source.

17. An electric power amplifier comprising an electron discharge device provided with input and output circuits, a transformer provided with input and output circuits, electrical connections between the electric supply source to be amplified and the input circuit of said electron discharge device including the output circuit of said transformer, a second transformer provided with input and output circuits, electrical connections between the output circuit of said electric discharge device and the input circuit of said second transformer, and connections between the output circuit of said second transformer and said supply source whereby their voltages are in opposition including the input circuit of said first transformer whereby a predetermined relation is maintained between the output circuit of said second transformer and said supply means.

In witness whereof, I have hereunto set my hand this 29th day of September, 1925.

ERNST F. W. ALEXANDERSON.